United States Patent
Miller et al.

(10) Patent No.: US 9,610,853 B1
(45) Date of Patent: Apr. 4, 2017

(54) IDENTIFICATION OF ACCEPTABLE VEHICLE CHARGE STATIONS

(71) Applicant: Ford Global Technologies, LLC, Dearborn, MI (US)

(72) Inventors: Kenneth James Miller, Canton, MI (US); Jimmy Kapadia, Ottawa Hills, OH (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/863,568

(22) Filed: Sep. 24, 2015

(51) Int. Cl.
 *B60L 11/00* (2006.01)
 *B60L 11/18* (2006.01)
 *G05D 1/00* (2006.01)

(52) U.S. Cl.
 CPC ........ *B60L 11/1838* (2013.01); *G05D 1/0088* (2013.01)

(58) Field of Classification Search
 None
 See application file for complete search history.

(56) References Cited

U.S. PATENT DOCUMENTS

| | | | | |
|---|---|---|---|---|
| 6,181,991 B1* | 1/2001 | Kondo | ............. | B60L 11/1816 701/1 |
| 6,542,812 B1* | 4/2003 | Obradovich | ....... | G01C 21/3461 340/990 |
| 7,957,871 B1* | 6/2011 | Echeruo | ............. | G01C 21/3626 104/27 |
| 8,000,892 B2* | 8/2011 | Banerjee | ............. | G01C 21/20 340/988 |
| 8,155,867 B2* | 4/2012 | Krause | ............. | G07C 5/008 455/39 |
| 8,170,737 B2* | 5/2012 | Tate, Jr. | ............. | B60W 10/06 701/105 |
| 8,175,802 B2* | 5/2012 | Forstall | ............. | G01C 21/3484 701/424 |
| 8,315,788 B2* | 11/2012 | Surnilla | ............. | G01C 21/26 701/123 |
| 8,326,478 B2* | 12/2012 | Ichikawa | ............. | B60K 6/445 180/65.245 |
| 8,433,344 B1* | 4/2013 | Virga | ............. | G09B 29/106 455/457 |
| 8,560,216 B1* | 10/2013 | Kahn | ............. | G01C 21/3469 340/438 |
| 8,612,139 B2* | 12/2013 | Wang | ............. | G01C 21/3461 701/400 |
| 8,615,355 B2* | 12/2013 | Inbarajan | ............. | B60L 11/1809 701/123 |

(Continued)

FOREIGN PATENT DOCUMENTS

WO 2013056990 A2 4/2013

*Primary Examiner* — Jonathan M Dager
(74) *Attorney, Agent, or Firm* — Frank A. MacKenzie; Brooks Kushman P.C.

(57) ABSTRACT

A vehicle may require an electric recharge. A request may be sent to obtain identification of charge locations along a route. Along with the request, data may be sent identifying vehicle location, route, and desired safety rating. A response may be obtained from a remote server, and the results may be displayed, which include the safety rating of the charge station. The desired safety rating may be adjusted based on the battery's state of charge (SOC). The desired safety rating, for example, may be decreased as the battery state of charge decreases.

13 Claims, 6 Drawing Sheets

(56) References Cited

U.S. PATENT DOCUMENTS

| | | | | |
|---|---|---|---|---|
| 8,731,974 B2* | 5/2014 | Pandhi | G06Q 40/08 | 705/4 |
| 8,738,277 B1* | 5/2014 | Kurosawa | G01C 21/3679 | 701/123 |
| 8,880,238 B2* | 11/2014 | Reich | G01C 21/3682 | 701/1 |
| 8,965,669 B2* | 2/2015 | Fisher | B60L 11/1861 | 701/117 |
| 8,989,954 B1* | 3/2015 | Addepalli | H04W 4/046 | 370/328 |
| 9,002,632 B1* | 4/2015 | Emigh | G06Q 30/02 | 340/995.19 |
| 9,026,347 B2* | 5/2015 | Gadh | B60L 11/1842 | 320/109 |
| 9,156,369 B2* | 10/2015 | Loftus | B60L 11/1838 | |
| 2005/0149250 A1* | 7/2005 | Isaac | G01C 21/3679 | 701/32.3 |
| 2006/0129313 A1* | 6/2006 | Becker | G01C 21/3484 | 701/533 |
| 2009/0063680 A1* | 3/2009 | Bridges | B60L 11/1824 | 709/224 |
| 2009/0265099 A1* | 10/2009 | Gottlieb | G01C 21/3697 | 701/532 |
| 2009/0312903 A1* | 12/2009 | Hafner | B60L 8/003 | 701/36 |
| 2009/0313033 A1* | 12/2009 | Hafner | B60L 8/003 | 705/1.1 |
| 2010/0036599 A1* | 2/2010 | Froeberg | G01C 21/3461 | 701/532 |
| 2010/0114798 A1* | 5/2010 | Sirton | B60L 11/1816 | 705/412 |
| 2011/0022254 A1* | 1/2011 | Johas Teener | G06F 1/26 | 701/22 |
| 2011/0156662 A1* | 6/2011 | Nakamura | B60L 11/1822 | 320/162 |
| 2011/0160992 A1* | 6/2011 | Crombez | B60W 30/182 | 701/123 |
| 2011/0191220 A1* | 8/2011 | Kidston | G06Q 30/04 | 705/34 |
| 2011/0288765 A1* | 11/2011 | Conway | G01C 21/3469 | 701/533 |
| 2011/0301806 A1* | 12/2011 | Messier | G01C 21/3469 | 701/423 |
| 2012/0123806 A1* | 5/2012 | Schumann, Jr. | G08G 1/096775 | 705/4 |
| 2012/0166012 A1* | 6/2012 | Lee | B60L 11/1838 | 700/297 |
| 2012/0179323 A1* | 7/2012 | Profitt-Brown | G01C 21/26 | 701/29.1 |
| 2012/0179359 A1* | 7/2012 | Profitt-Brown | G01C 21/3469 | 701/123 |
| 2012/0296678 A1* | 11/2012 | Boot | G06Q 10/02 | 705/5 |
| 2013/0009765 A1* | 1/2013 | Gilman | B60L 1/003 | 340/455 |
| 2013/0041850 A1* | 2/2013 | LaFrance | B60L 11/1838 | 705/412 |
| 2013/0138542 A1* | 5/2013 | Sirton | G06Q 10/0631 | 705/34 |
| 2013/0226441 A1* | 8/2013 | Horita | B60Q 9/00 | 701/118 |
| 2013/0290201 A1* | 10/2013 | Rodriguez Carrillo | G06Q 50/30 | 705/318 |
| 2013/0339072 A1* | 12/2013 | Touge | G06Q 10/00 | 705/5 |
| 2013/0345958 A1* | 12/2013 | Paek | G01C 21/3679 | 701/400 |
| 2013/0346902 A1* | 12/2013 | Epstein | G06F 3/0484 | 715/771 |
| 2014/0142770 A1* | 5/2014 | Sellschopp | G06F 1/26 | 700/291 |
| 2014/0188304 A1* | 7/2014 | Richter | B60L 3/00 | 701/1 |
| 2014/0236462 A1* | 8/2014 | Healey | G08G 1/0962 | 701/117 |
| 2014/0277872 A1* | 9/2014 | MacNeille | G01C 21/3415 | 701/22 |
| 2014/0278104 A1* | 9/2014 | Proietty | G01C 21/3438 | 701/537 |
| 2014/0354228 A1* | 12/2014 | Williams | B60L 11/1844 | 320/109 |
| 2014/0371969 A1* | 12/2014 | Asai | B60L 7/16 | 701/22 |
| 2014/0379183 A1* | 12/2014 | Long | B60W 40/12 | 701/22 |
| 2015/0045985 A1* | 2/2015 | Yenamandra | G01C 21/3679 | 701/1 |
| 2015/0106001 A1* | 4/2015 | Lee | G01C 21/3469 | 701/123 |
| 2015/0158486 A1* | 6/2015 | Healey | B60W 30/12 | 701/23 |
| 2015/0241233 A1* | 8/2015 | Loftus | G01C 21/3682 | 701/410 |
| 2015/0253144 A1* | 9/2015 | Rau | G01C 21/3415 | 705/348 |
| 2015/0266356 A1* | 9/2015 | Fischer | E05F 15/77 | 701/36 |
| 2015/0362988 A1* | 12/2015 | Yamamoto | G06F 3/011 | 345/156 |
| 2016/0025506 A1* | 1/2016 | Penilla | G06Q 20/18 | 701/430 |
| 2016/0035001 A1* | 2/2016 | Driscoll | G06Q 30/0631 | 705/26.7 |
| 2016/0052413 A1* | 2/2016 | Shimizu | B60L 11/184 | 700/291 |
| 2016/0068121 A1* | 3/2016 | Maini | B60R 16/03 | 307/10.1 |
| 2016/0075247 A1* | 3/2016 | Uyeki | B60L 11/1842 | 455/456.3 |
| 2016/0091338 A1* | 3/2016 | Abuelsaad | G01C 21/3697 | 701/538 |
| 2016/0098412 A1* | 4/2016 | Davidsson | G01C 21/3407 | 707/770 |
| 2016/0126732 A1* | 5/2016 | Uyeki | G05B 15/02 | 700/295 |

* cited by examiner

IDENTIFICATION OF ACCEPTABLE VEHICLE CHARGE STATIONS

TECHNICAL FIELD

The present disclosure relates to identifying acceptable vehicle charge stations along a travel route.

BACKGROUND

An electric vehicle requires recharging after use. A charging station may be located off a desired route, located in a dangerous area, missing available plugs, located far from an attraction, or provide the wrong type of electricity. Users of electric vehicles may be able to find charge stations that are nearby or on-route without knowledge of whether these locations are dangerous or undesirable. Information may be unavailable to the passenger or autonomous vehicle such that an informed decision cannot be made.

SUMMARY

A vehicle may require an electric recharge. A request may be sent to obtain identification of charge locations along a predefined route. Along with the request, data may be sent identifying vehicle location, route, and desired safety rating. A response may be obtained from a remote server, and the results may be displayed, which include the safety rating of the charge station. The desired safety rating may be adjusted based on the battery's state of charge (SOC). The desired safety rating may be decreased as the battery state of charge decreases.

Further, charge stations with safety ratings that exceed desired safety ratings, activity ratings that exceed desired activity ratings, and utility ratings that exceed desired utility ratings accessible from the route may be displayed. The safety ratings may include categorized crime data, a statistical crime value, or an aggregated user safety rating.

DETAILED DESCRIPTION

Figure 1:
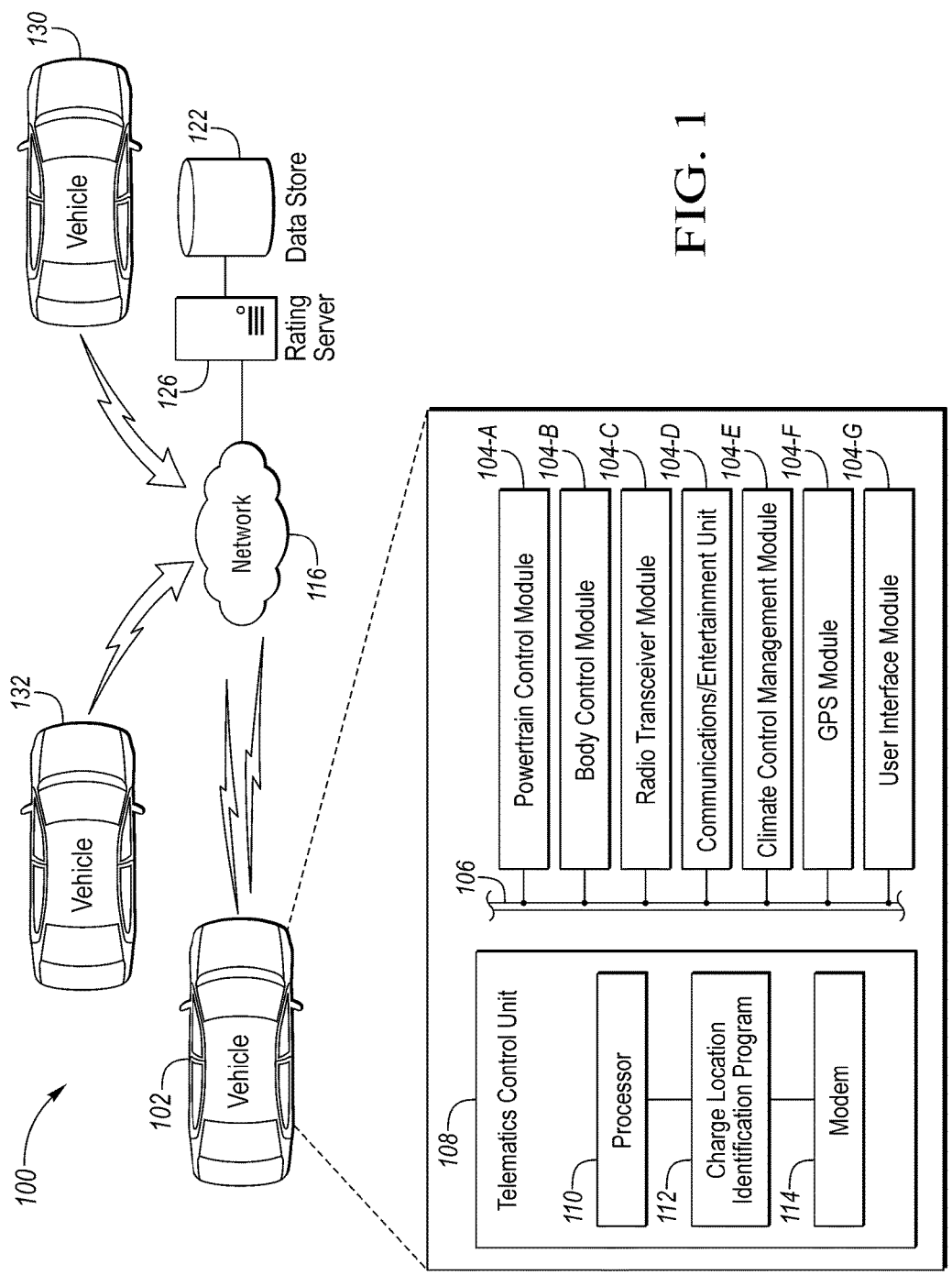
FIG. 1 is a schematic diagram of an operating environment for a mobile vehicle communication system usable in implementations of the described principles.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles can be powered by battery electricity (BEVs) for propulsion and other electrical loads. The battery may be recharged by a secondary power source (e.g. charging station, internal combustion engine, or solar panel). The battery may be arranged in an array with other batteries to provide additional voltage or longevity, and any type of battery may be used. Any type of battery including different combinations of electrolyte, anode material, cathode material, or combination thereof may power BEVs. In addition, capacitors may also be used to substitute or supplement battery arrays. Some common batteries in BEVs may include nickel-metal hydride, lead-acid, and lithium-ion. Vehicles may also be powered via a combination of battery electricity and internal combustion engine. Referred to as hybrid electric vehicles, these vehicles typically employ a combination of battery and engine propulsion. Hybrid electric vehicles may also use charging stations to recharge internal batteries.

Vehicles can either be autonomous or user-governed. An autonomous vehicle may automatically transport cargo or passengers to a desired location. A preprogrammed or programmed on-the-fly destination is entered, and the autonomous vehicle follows a generated route. Similarly, a user-governed vehicle may also obtain preprogrammed or on-the-fly destination routing. Either vehicle may require recharging of the battery while on the route. A global position system (GPS) may be used to determine the location of the vehicle. A plurality of proximate charging stations can be generated based on distance from the route and convenience.

A server may be configured to send and receive data from any number of clients. The server may be connected to a DataMart, data store, or data warehouse as a repository for server data. Any number of clients may enter information into the data store in order to provide accurate charging location data. The location data may be located on a server accessible via the Internet or within the vehicle itself. The server may contain data related to location ratings. Location ratings may include an abundance of information that may indicate the desirability of the charge location. Information used to populate the location rating may include: 1) data obtained from the cloud, 2) data obtained from other users, 3) proximity data indicating the distance between the charge station and other attractions (e.g., malls, stores, restaurants, activity centers, etc.), 4) data including crime rates and statistics, 5) data indicative of previous users general feeling of safety, 6) indication of available charge plugs, 7) characteristics of the electrical supply, 8) and any other information that may be necessary to form a location rating.

A vehicle location system may include many processors and controllers. A controller or processor would generally include any number of processors, ASICs, ICs, Memory (e.g., Flash, ROM, RAM, EPROM, and/or EEPROM) and software code to co-act with one another to perform a series of operations. A microprocessor within a controller may further include a clock to provide timing and synchronization. A controller may communicate over a CAN bus or controller area network to other components or using other communications protocols. A controller or processor may also communicate over wireless networks to obtain data beyond the vehicle. A vehicle controller may send data off-board to the server and may receive data from the server. A vehicle controller may provide the server with the current state of charge or use the current state of charge to determine a target charge station. Sending data off-board could include data to a server located outside of the vehicle or to a server within the vehicle. The vehicle controllers and rating server may comprise a system for determining available charge stations along with the battery state of charge.

A vehicle controller may determine a battery state of charge using a battery charge controller or other system. The battery state of charge may depend on numerous factors (e.g., service time, usage, type of usage, etc.). The system may use many different factors in determining proximate charging stations. For instance, the charging station location system may identify the driver's route and location of next expected charge event (usually home, or work). The system may also estimate or learn the route from history (e.g., drive routes, time of day, and day of week). The system may identify "Daily Locations" by recognizing reoccurring GPS locations, and organize them by the location and time that charging or parking typically occurs.

This means, for example, that if a vehicle parks or charges at a specific location more than three times per week on average the system will use that space as a "Daily Location." Similarly, if a vehicle parks or charges at a specific location on a certain day more than once per month, the system will recognize that as a "Daily Location."

Further, the system can recognize "Historical Locations," which are retained when a vehicle has charged at the specified location one or more times in the past two months.

Data obtained from the cloud could include any information that a passenger could be interested in. This cloud data could include retrievable statistics from review sources providing the information. This information could include restaurant reviews or shopping attractions.

Users could also provide information. After or during use, a user could be instructed to rate the charge station on numerous characteristics, which are then sent by to the server. The users could provide information related to safety, activities, and utilities at each charge station. Some of the data may be real-time and other data may be historically tracked. Charge stations could also send information related to the safety, activities, and utilities available.

A safety rating could include many different factors. A safety rating could include statistical information obtained from crime statistics authorities. A safety rating could also include categorical information related to types of crimes occurring nearby. A vehicle owner may be particularly interested in car theft statistics or armed robbery statistics. In addition, the safety rating could be determined by an aggregation of user reports and replies. Users may be queried on past events or general safety feelings when using the charge station. Users may, in addition, be queried on general feelings of the area the charge station is located in such as the widely held reputation of the borough or district. Recent crimes may be reported in a list to the passenger or vehicle, or recent crimes may be pinpointed on a map.

A utility rating could include many different factors. A utility rating could include the number of available plugs available. In addition, a utility rating could include the required voltage and adapter used to recharge the vehicle battery. The utility rating could also include the cost of electricity at each particular recharge station. A utility rating could include any practical or pragmatic factors that may be used to determine the usability of the charge station.

An activity rating could include many different factors related to attractions. An activity rating could include the proximity of malls, stores, restaurants, activity centers, movie theatres, museums, libraries, parks, and zoos. The activity rating could include any presumable activity that someone might do while recharging their car battery.

Desirable charge locations may be determined by the state of charge (SOC) remaining in the battery. A processor may determine a probable charge level remaining when arriving at each potential charge station by estimating the watt-hours required to travel the remaining distance to each charge station. The system may only display charge stations that do not require back-tracking. For example, when a driver leaves work, the driver does not want to back-track to the work location to charge.

In addition, if the probable charge level remaining when arriving at the charge station drops below minimum thresholds, a controller may take the increasingly intrusive actions such as reducing the desired safety rating or portions of the desired safety rating to indicate additional charge stations that may have not been previously included because the charge stations did not meet the originally desired safety level.

An indicator screen may notify a passenger of different anticipated battery states. For instance, if a vehicle or server estimates that the charge level will be less than 20% after reaching a "Daily Location," the system may display, "Approximately 20% remaining on arrival."

If a vehicle or server estimates that charge level will be less than 10% after reaching a "Daily Location," then the vehicle may optimize efficiency of the powertrain by adjusting the operation of the vehicle's pedal demand, climate controls, accessory loads, HEV battery operation, regenerative breaking, or enter an ECO mode.

Further, if a vehicle or server estimates that charge level will be less than 2% after reaching a "Daily Location," then it may display suggested routes on-screen to pass by any "good" charge station. If a vehicle or server estimates that charge level will be less than 0% (0% being an indicated minimum threshold value and not necessarily representing actual battery voltage) after reaching a "Daily Location," then it may display suggested routes on-screen to pass by any "poor" charge station. "Good" and "Poor" stations may be identified based on their safety, activity, or utility ratings.

If a vehicle or server estimates that charge level will be less than −5% (−5% being an actual value of less than an indicated minimum threshold and not negative voltage) after reaching a "Daily Location," or "Historical Location," then it may show or speak a warning that the customer should take a suggested route to avoid running out of charge. These steps may be performed by a self-governed or autonomous vehicle. An autonomous vehicle may adjust the desired safety rating automatically in order to avoid running out of charge. With this adjustment, an autonomous vehicle may automatically decrease the safety rating in line with the battery state of charge. This will ensure that the vehicle does not deplete the batteries entirely. It is possible that the vehicle would only be programmed to stop at charge stations on the way to the destination. The vehicle may also be programmed to allow passenger intervention in order to veto an intended charge station that does not meet the passengers' personal safety requirements.

Each of the aforementioned thresholds may be adjusted by the manufacturer or on-the-fly based on road conditions. For instance, a vehicle that was traveling in hazardous conditions may prefer the 5% threshold to activate when the battery is projected to reach 10% in the case that they are stranded due to weather (e.g., mountain climates with snowstorms). A vehicle in these situations may provide shelter and heat from the elements. Therefore, none of the aforementioned thresholds are intended to be permanent.

Referring to FIG. 1, a vehicle 102 may include a telematics control unit 108, a powertrain control module 104-A, a body control module 104-B, a radio transceiver module 104-C, a communications and entertainment unit 104-D, a climate control management module 104-E, a GPS module 104-F, and a user interface module 104-G. The vehicle 102 may be communicatively connected through a network 116 to a rating and charge station location server 126 that has a data store 122 for holding rating data. Additional vehicles 130, 132 may provide information to the rating and charge station location server 126 over the network 116. The network 116 may be a local controller area network, cellular network, or the Internet. Data may be transmitted over any physical medium using wireless protocols (802.11, Bluetooth, GSM, or CDMA) or wired protocols. Data may be formed into packets and have guaranteed delivery (TCP). Data may be stored in the data store 122 using a SQL database or other similar relational database architecture.

Figure 2:
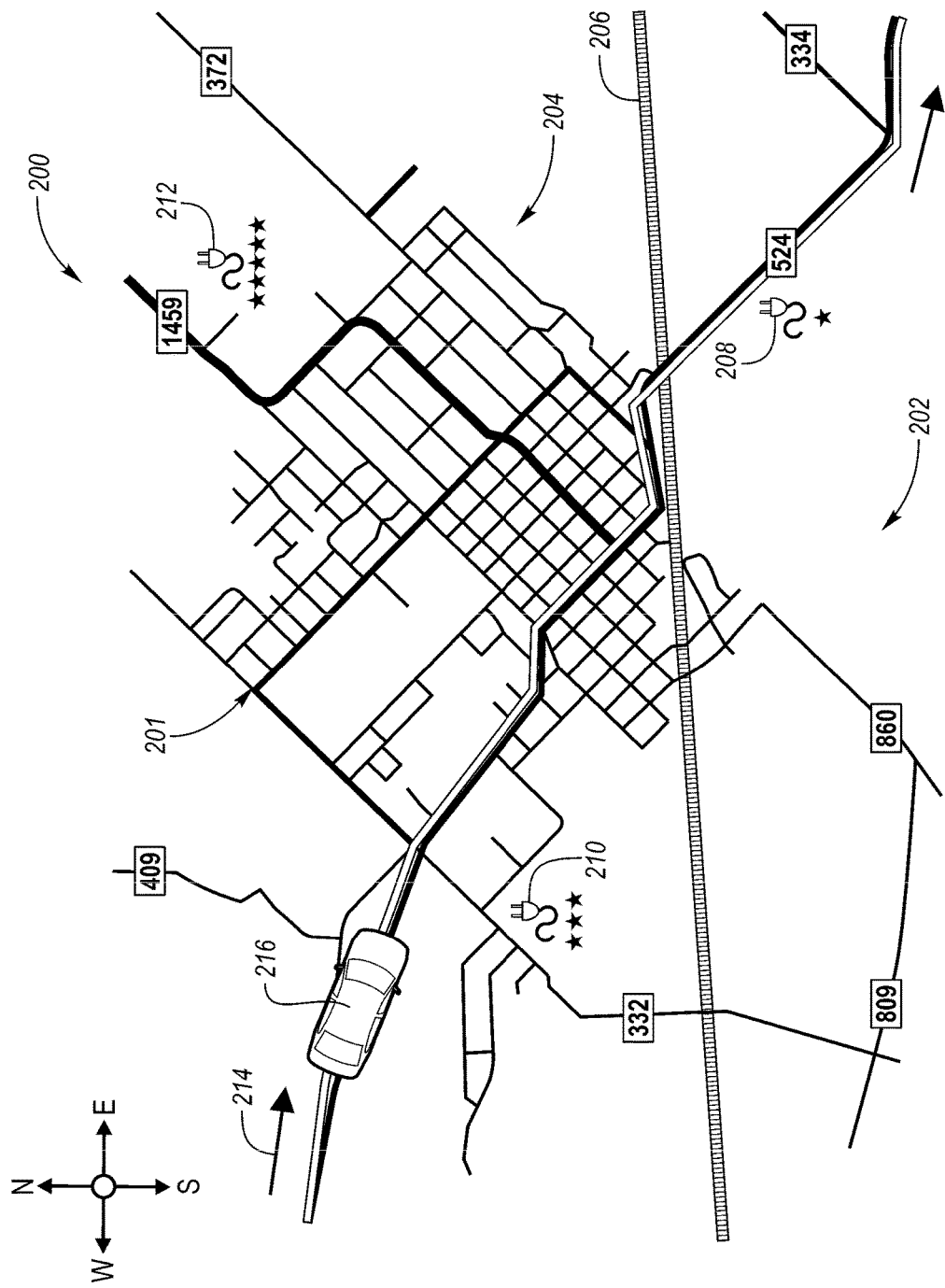
FIG. 2 is a schematic diagram of a display of a road map on a display screen of a vehicle.

Referring to FIG. 2, a map 200 of a city 201 is shown. The map includes an unsafe area 202 south of the railroad tracks 206. The map includes a safe area 204 north of the railroad tracks 206. A start point 214 shows a direction of travel for a vehicle 216. The vehicle 216 is on the way to a work location (not shown) to the east of the city 201. Having a desired safety rating of five stars, a vehicle 216 may receive indication of the charge station 212. Having a desired safety rating of five stars, the vehicle 216 would not receive indication of the lower starred charge stations 208, 210. If the vehicle 216 predicts a battery state of charge lower than desired at the assumed or disclosed destination, the desired safety rating may be adjusted automatically to three stars and display the charge station 210 even though the charge station 208 is closer to the anticipated route. If the vehicle 216 predicts a battery state of charge lower than desired at the assumed or disclosed destination, the vehicle may adjust the desired safety rating automatically to one star and display the charge station 208 even though the charge station 208 is on the unsafe side of the tracks.

Figure 3:
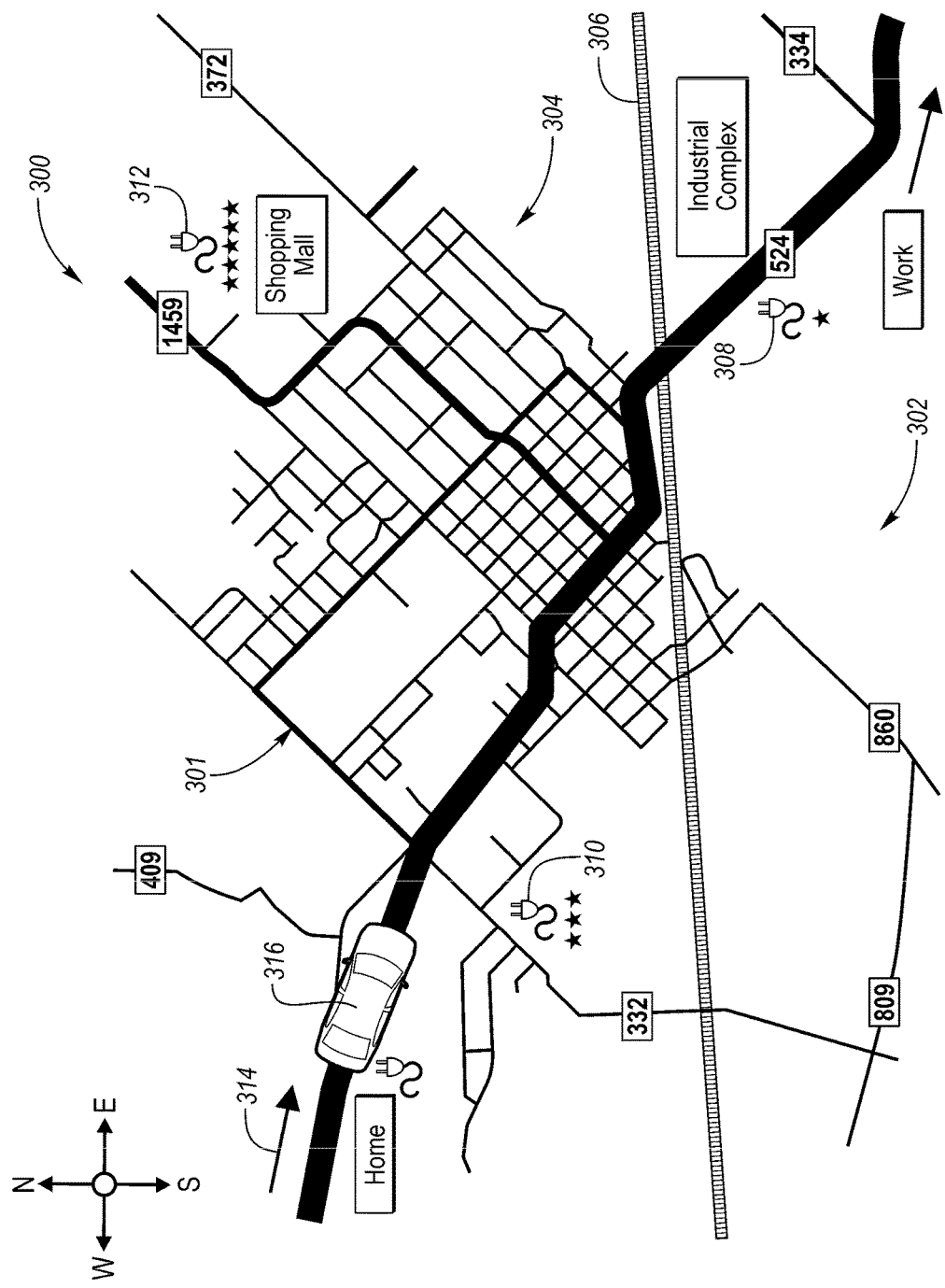
FIG. 3 is a schematic diagram of a display of a road map on a display screen of a vehicle including activities.

Referring to FIG. 3, a map 300 of a city 301 is shown. The map includes an unsafe area 302 south of the railroad tracks 306. The map includes a safe area 304 north of the railroad tracks 306. A start point 314 shows a direction of travel for a vehicle 316. The vehicle 316 is on its way to work (not shown) to the east of the city 301. Having a desired safety rating and desired activity rating of five stars or an average of the desired safety rating and desired activity rating of five stars, a vehicle 316 may receive indication of the charge station 312. The vehicle 316 would not receive indication of the lower starred charge stations 308, 310. If the vehicle 316 has a battery with a lower state of charge, the vehicle may adjust the desired safety rating automatically to three stars and display the charge station 310 even though the charge station 310 is closer to the other side of the tracks. If the vehicle 316 has a battery with a minimum state of charge, the vehicle may adjust the desired safety rating automatically to one star and display the charge station 308 even though the charge station 308 is on the unsafe side of the tracks. Similarly, the activity rating could instead be a utility rating or other rating type.

Figure 4:
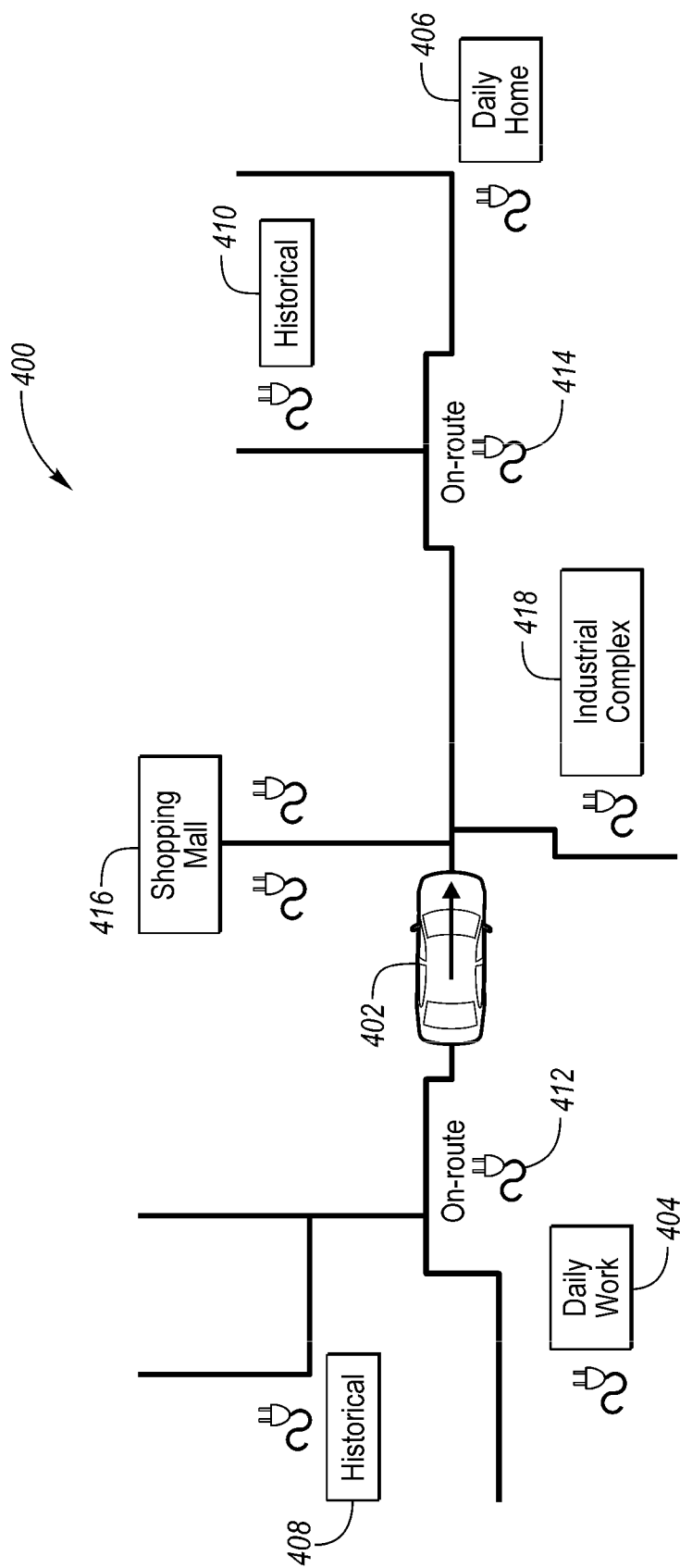
FIG. 4 is a map of a route with available "Daily Locations," "Historical Locations," "On-route Locations," "Unsafe Locations," and "Safe Locations."

Referring to FIG. 4, a map 400 of a route is shown. A vehicle 402 is depicted. A vehicle 402 has recently left a daily work location 404. If a projected battery state of charge after reaching a "Daily Location" such as the daily home 406 is less than 20%, then the projected battery state of charge will be displayed on a screen for the passenger. If a projected battery state of charge after reaching a "Daily Location" such as the daily home 406 is less than 15%, then the projected battery state of charge may be aurally announced to warn the passenger. If a projected battery state of charge after reaching a "Daily Location" such as the daily home 406 is less than 10%, then power conservation efforts will be executed to extend battery life. If a projected battery state of charge after reaching a "Daily Location" such as the daily home 406 is less than 5%, then the vehicle 402 can suggest using historical charge stations 408, 410 or on-route charge stations 412, 414. However, if the vehicle has already passed charge station 412, it may not be suggested. The system may also identify locations with projected battery state of charge on arrival. If a projected battery state of charge after reaching a "Daily Location" such as the daily home 416 is less than 2%, then locations that were not daily, historical, or on-route may be displayed as long as they meet the desired safety, activity, or utility rating. If a projected battery state of charge after reaching a "Daily Location" such as the daily home 416 is less than 0%, then locations that were not daily, historical, or on-route may be displayed even if they do not meet the desired safety, activity, or utility rating. If a projected battery state of charge after reaching a "Daily Location" such as the daily home 416 is less than −5%, then locations that were not daily, historical, or on-route may be displayed even if they do not meet the desired safety, activity, or utility rating and indications that the vehicle 402 should head directly to any charge station is displayed. All of these categorical decisions are applicable to either a self-governed vehicle or an autonomous vehicle.

Figure 5:
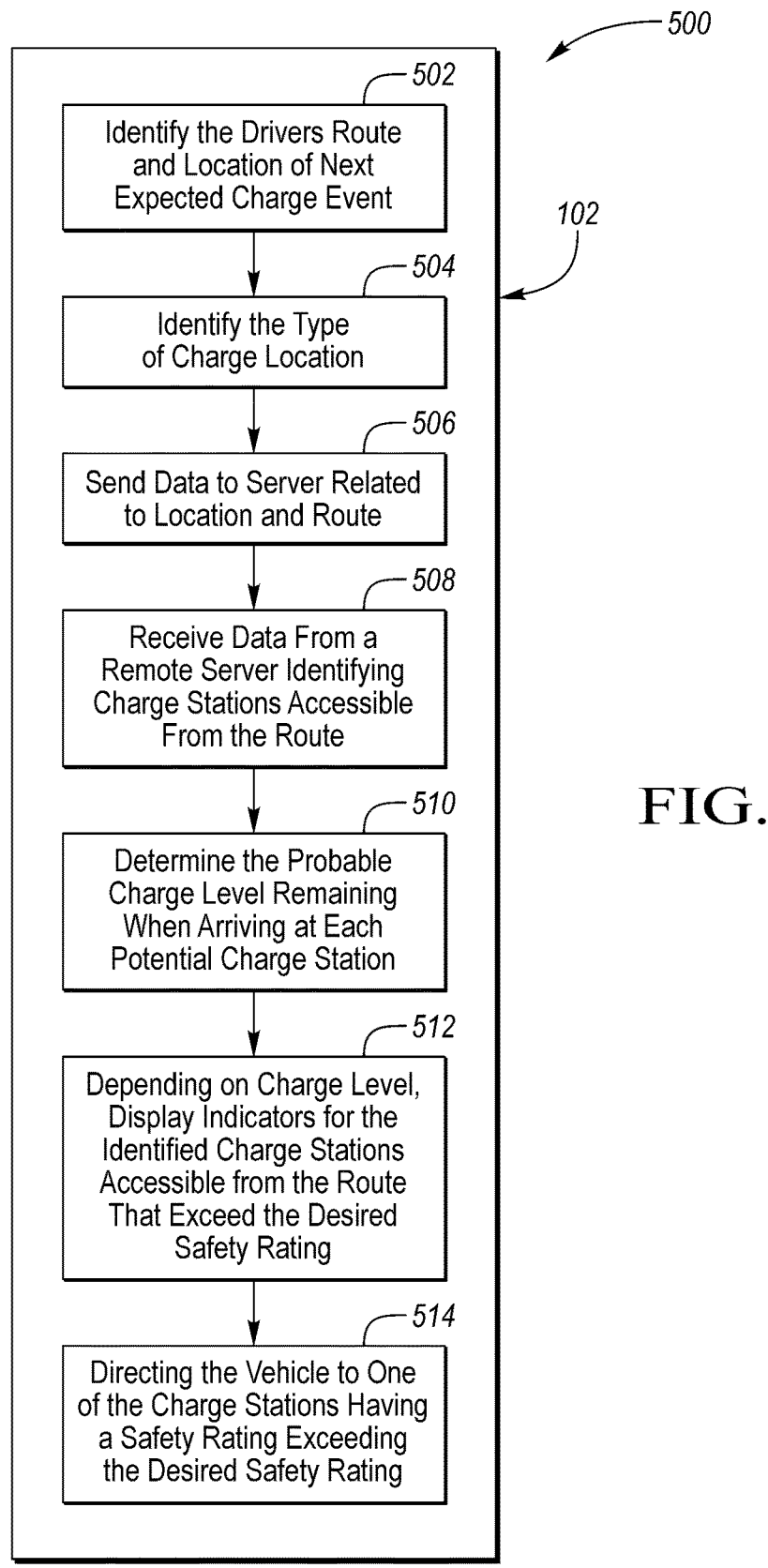
FIG. 5 is an algorithm for determining a desirable charge station based on a variety of factors.

Referring to FIG. 5, a flow diagram 500 is depicted. Starting in step 502, a route and location is identified related to the next charge location. In step 504, types of charge locations are identified. In step 506, the vehicle sends data to a server related to its current location and intended route. In step 508, the vehicle receives data from the server identifying charge stations accessible from the route. The vehicle or server may determine the probable charge level remaining when arriving at each potential charge station in step 510. In step 512, the vehicle may display indicators for the identified charge stations accessible from the route that exceed the desired safety rating, depending on a charge level. In step 514, the vehicle is directed to one of the charge stations having a safety rating exceeding the desired safety rating.

Figure 6:
FIG. 6 is a selectable display in a vehicle capable of prompting a user for a desired safety rating.

Referring to FIG. 6, an example of an input screen related to a desired safety rating is depicted. A user may enter the desired safety rating by selecting one of the options on the display. A user could also transmit these options via a mobile device or computer. The desired safety rating could also be supplied by the manufacturer based on data gathering performed by the manufacturer or the cost of the vehicle.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a processor programmed to,
responsive to a request to identify charge locations along a route, send data off-board defining a desired safety rating,
responsive to receipt of data from a remote server identifying charge stations each having a safety rating that exceeds the desired safety rating, display indicators for the identified charge stations accessible from the route; and
decrease the desired safety rating as battery state of charge decreases.

2. The vehicle of claim 1, wherein the processor is further programmed to send data off-board identifying a desired activity rating, and in response to receipt of data from a remote server identifying charge stations each having a safety rating that exceeds the desired safety rating and an activity rating that exceeds the desired activity rating, display indicators for the identified charge stations having the safety rating that exceeds the desired safety rating and the activity rating that exceeds the desired activity rating accessible from the route.

3. The vehicle of claim 1, wherein the processor is further programmed to send data off-board identifying a desired utility rating, and in response to receipt of data from a remote server identifying charge stations each having a safety rating that exceeds the desired safety rating and a utility rating that exceeds the desired utility rating, display indicators for the identified charge stations having the safety rating that exceeds the desired safety rating and the utility rating that exceeds the desired utility rating accessible from the route.

4. The vehicle of claim 1, wherein the indicators identify an activity rating or utility rating for at least some of the identified charge stations.

5. The vehicle of claim 1, wherein the safety rating includes categorized crime data, a statistical crime value, or an aggregated user safety rating.

6. A vehicle comprising:
a processor programmed to,
responsive to a request to identify charge locations along a predefined route, send data off-board defining a desired activity rating,
responsive to receipt of data from a remote server identifying charge stations each having an activity rating that exceeds the desired activity rating, display indicators for the identified charge stations accessible from the route; and
decrease the desired activity rating as battery state of charge decrease.

7. The vehicle of claim 6, wherein the processor is further programmed to send data off-board identifying a desired safety rating, and in response to receipt of data from a remote server identifying charge stations each having a safety rating that exceeds the desired safety rating and an activity rating that exceeds the desired activity rating, display indicators for the identified charge stations having the safety rating that exceeds the desired safety rating and the activity rating that exceeds the desired activity rating accessible from the route.

8. The vehicle of claim 7, wherein the safety rating includes categorized crime data, a statistical crime value, or an aggregated user safety rating.

9. The vehicle of claim 6, wherein the processor is further programmed to send data off-board identifying a desired utility rating, and in response to receipt of data from a remote server identifying charge stations each having an activity rating that exceeds the desired activity rating and a utility rating that exceeds the desired utility rating, display indicators for the identified charge stations having the safety rating that exceeds the desired safety rating and the utility rating that exceeds the desired utility rating accessible from the route.

10. The vehicle of claim 6, wherein the indicators identify a safety rating or utility rating for at least some of the identified charge stations.

11. A method for controlling an autonomous vehicle comprising:
sending data off-board identifying vehicle location and route;
receiving data from a remote server identifying charge stations accessible from the route and, for each of the charge stations, a safety rating;
decreasing a desired safety rating as battery state of charge decreases; and
directing the vehicle to one of the charge stations having a safety rating exceeding the desired safety rating.

12. The method of claim 11, wherein the one of the charge stations further has an activity rating exceeding a desired activity rating.

13. The method of claim 11, wherein the safety rating includes categorized crime data, a statistical crime value, or an aggregated user safety rating.

* * * * *